(12) United States Patent
Henderson

(10) Patent No.: US 6,782,667 B2
(45) Date of Patent: Aug. 31, 2004

(54) TILT-UP AND TELESCOPIC SUPPORT TOWER FOR LARGE STRUCTURES

(75) Inventor: Allan P. Henderson, Bakersfield, CA (US)

(73) Assignee: Z-Tek, LLC, Santa Monica, CA (US)

( * ) Notice: Subject to any disclaimer, the term of this patent is extended or adjusted under 35 U.S.C. 154(b) by 143 days.

(21) Appl. No.: 09/729,250

(22) Filed: Dec. 5, 2000

(65) Prior Publication Data

US 2002/0095878 A1 Jul. 25, 2002

(51) Int. Cl.[7] .............................................. B66C 23/00
(52) U.S. Cl. ..................... 52/116; 52/118; 52/123.1; 52/745.17; 212/347
(58) Field of Search ................. 52/69, 67, 64, 52/116, 117, 118, 119, 120, 123.1, 745.09, 745.11, 745.14, 745.17; 212/347; 343/883, 901; 248/371

(56) References Cited

U.S. PATENT DOCUMENTS

| | | |
|---|---|---|
| 11,181 A | 6/1854 | Straub |
| 133,017 A | 11/1872 | Davis |
| 446,744 A | 2/1891 | Robinson |
| 2,213,870 A | 9/1940 | Scholl |
| 2,267,705 A | 12/1941 | Athy |
| 2,384,279 A | 9/1945 | Calhoun |
| 2,675,211 A | 4/1954 | Regoord |
| 2,795,303 A | 6/1957 | Muehlhause et al. |
| 3,248,831 A | 5/1966 | Jones |
| 3,495,370 A | 2/1970 | Habro et al. |
| 3,500,429 A | 3/1970 | Majkrzak et al. |
| 3,638,806 A | 2/1972 | Hippach |
| 3,715,852 A | 2/1973 | Koga et al. |
| 4,079,559 A * | 3/1978 | Tenbrummeler ............. 52/295 |
| 4,151,534 A | 4/1979 | Bond |
| 4,176,360 A | 11/1979 | Leavy et al. |
| 4,231,200 A | 11/1980 | Henderson |
| 4,323,331 A | 4/1982 | Schachle et al. |
| 4,568,808 A | 2/1986 | Thuries et al. |
| 4,590,718 A | 5/1986 | Angeloff |
| 4,598,509 A | 7/1986 | Woolslayer et al. |
| 4,785,309 A | 11/1988 | Gremillion |
| 4,903,442 A | 2/1990 | Trommen |
| 4,932,175 A * | 6/1990 | Donnally ..................... 52/118 |
| 5,058,336 A * | 10/1991 | Jenvey ........................ 52/115 |
| 5,330,032 A * | 7/1994 | Warner ........................ 187/9 E |
| 5,537,125 A * | 7/1996 | Harrell, Jr. et al. ......... 343/878 |
| 6,408,575 B1 * | 6/2002 | Yoshida et al. ................ 52/40 |

FOREIGN PATENT DOCUMENTS

| | | |
|---|---|---|
| CH | 677 516 | 5/1991 |
| DE | 31 36 176 | 3/1983 |

* cited by examiner

Primary Examiner—Carl D. Friedman
Assistant Examiner—Jennifer I. Thissell
(74) Attorney, Agent, or Firm—Jacobson Holman PLLC

(57) ABSTRACT

A support tower for large structures such as wind turbines generators, microwave structures, high voltage transmission lines or the like, constructed of telescopic sections with the lowermost section having an edge portion pivotally connected to a foundation to enable the tower sections to be transported to the site of installation. The tower sections are assembled at the installation site in a nested relationship, each within the adjacent lower tower section. The large load is mounted on the upper end of the uppermost tower section and the nested tower sections are then tilted upwardly to a vertical position. After the tower is tilted to its vertical position and securely connected to the foundation, the telescopic tower sections are vertically extended to position the load in a vertically elevated position.

41 Claims, 12 Drawing Sheets

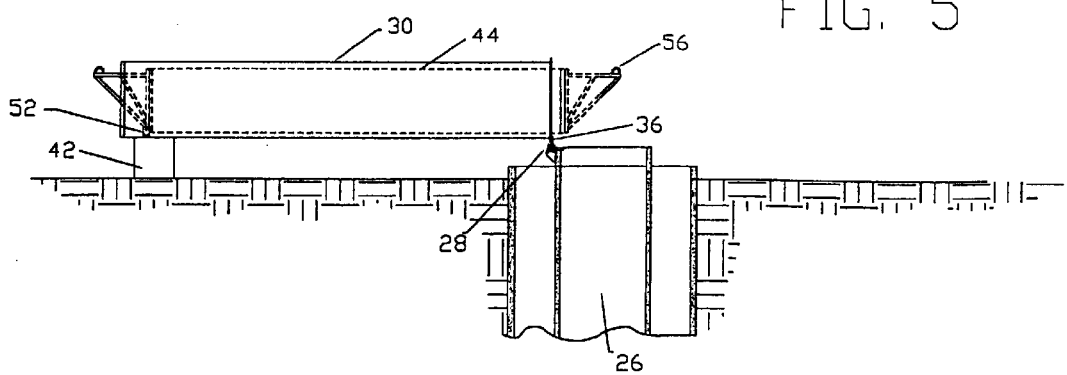
FIG. 5
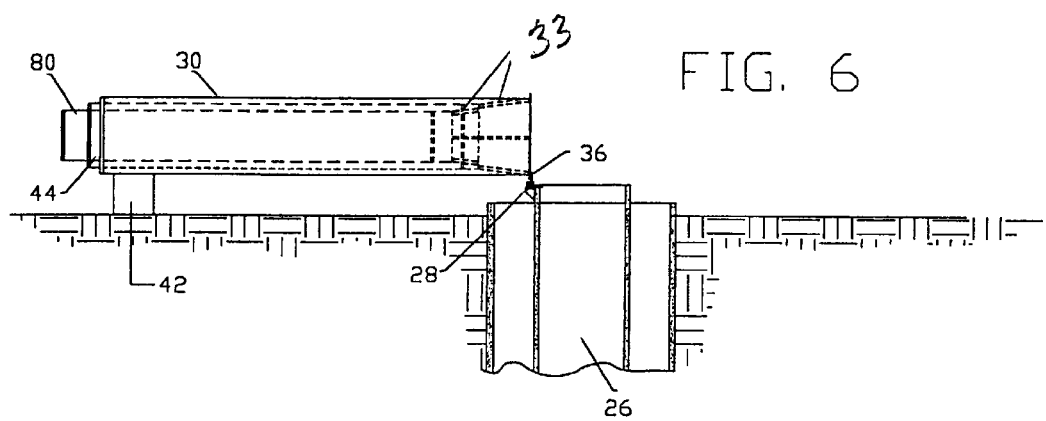
FIG. 6
FIG. 7
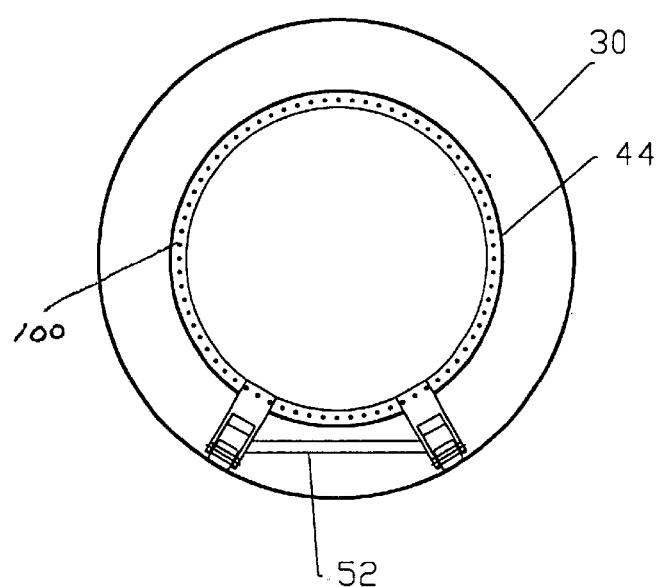

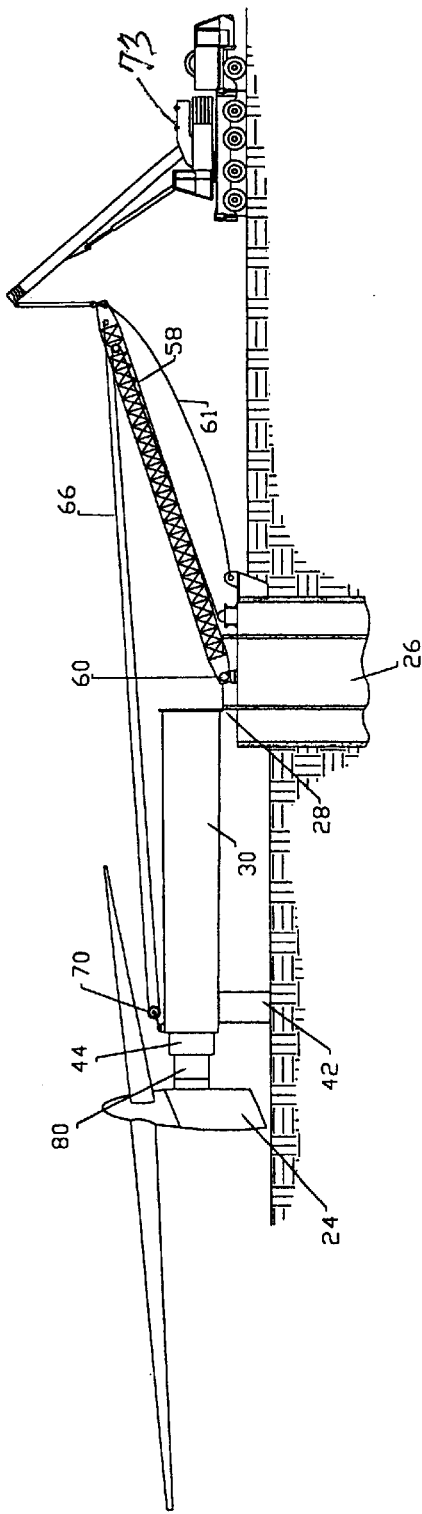
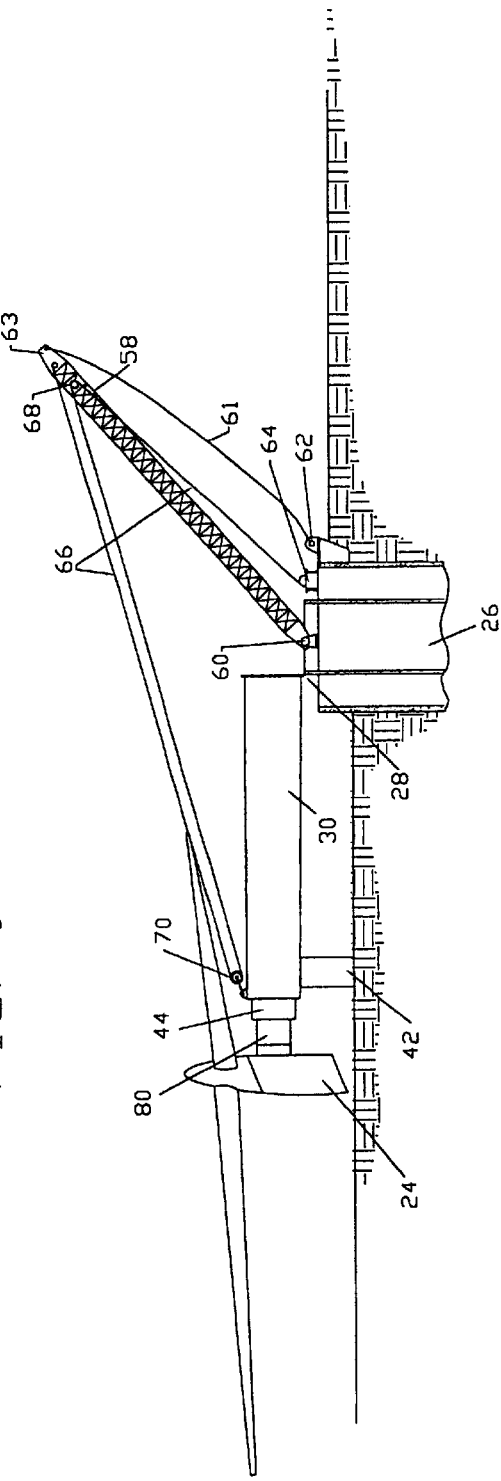

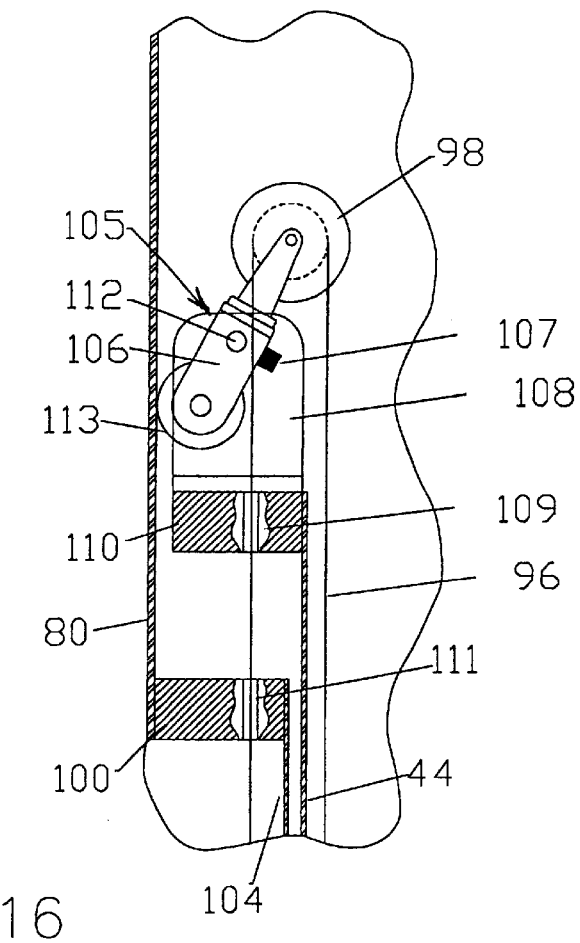

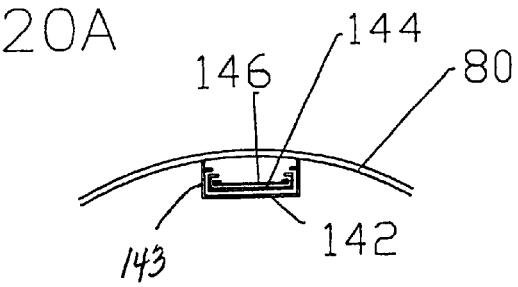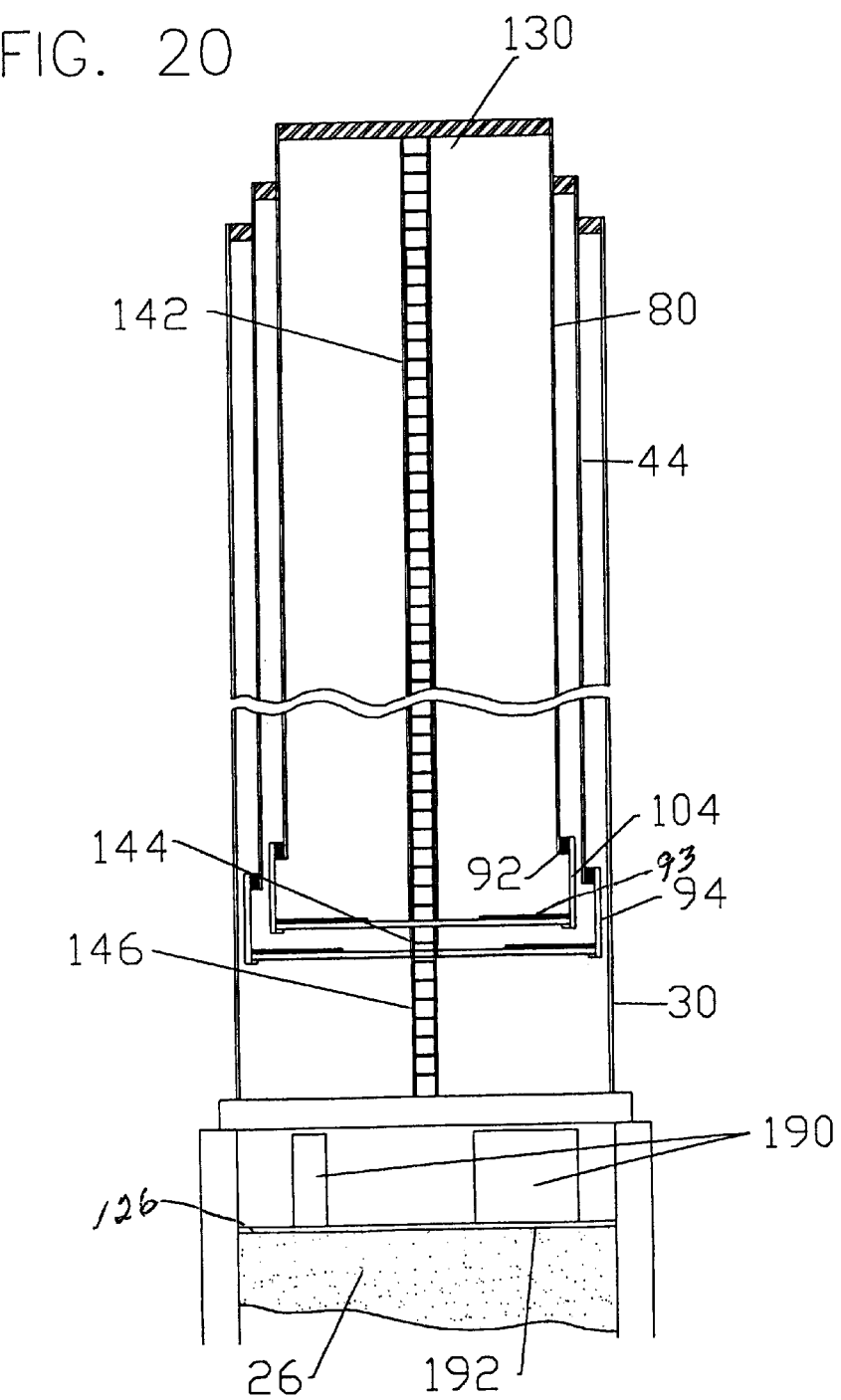

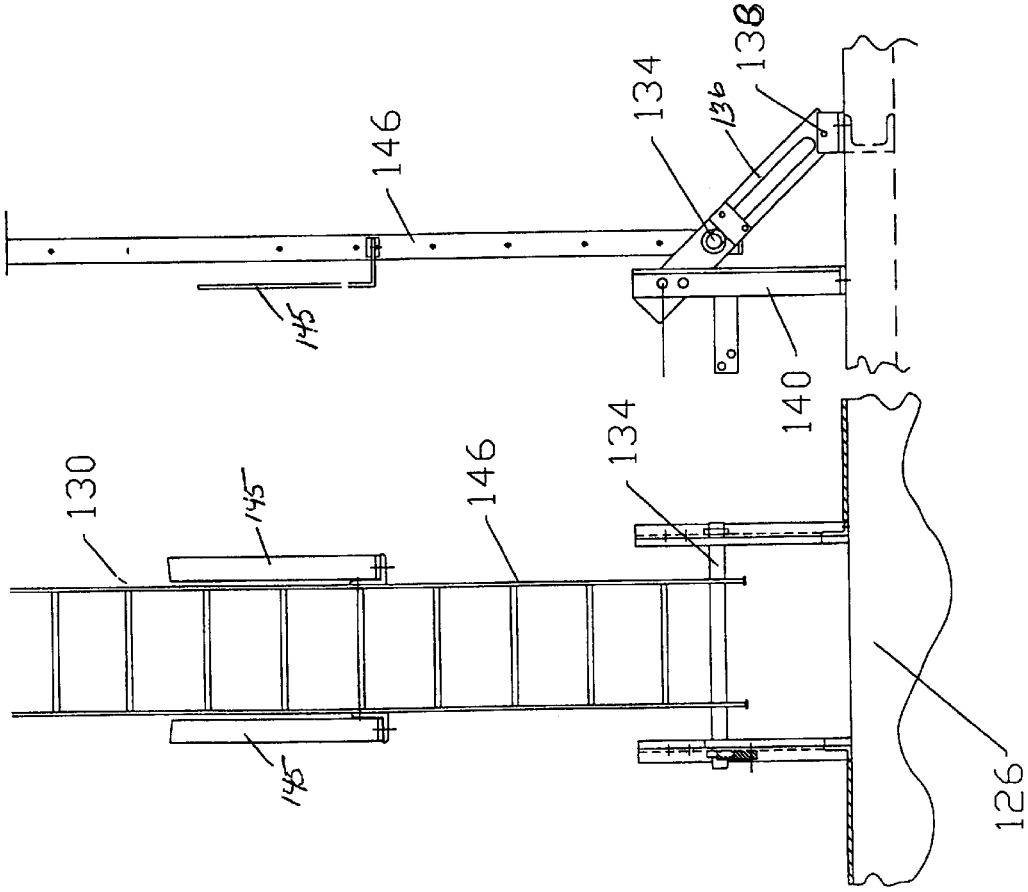

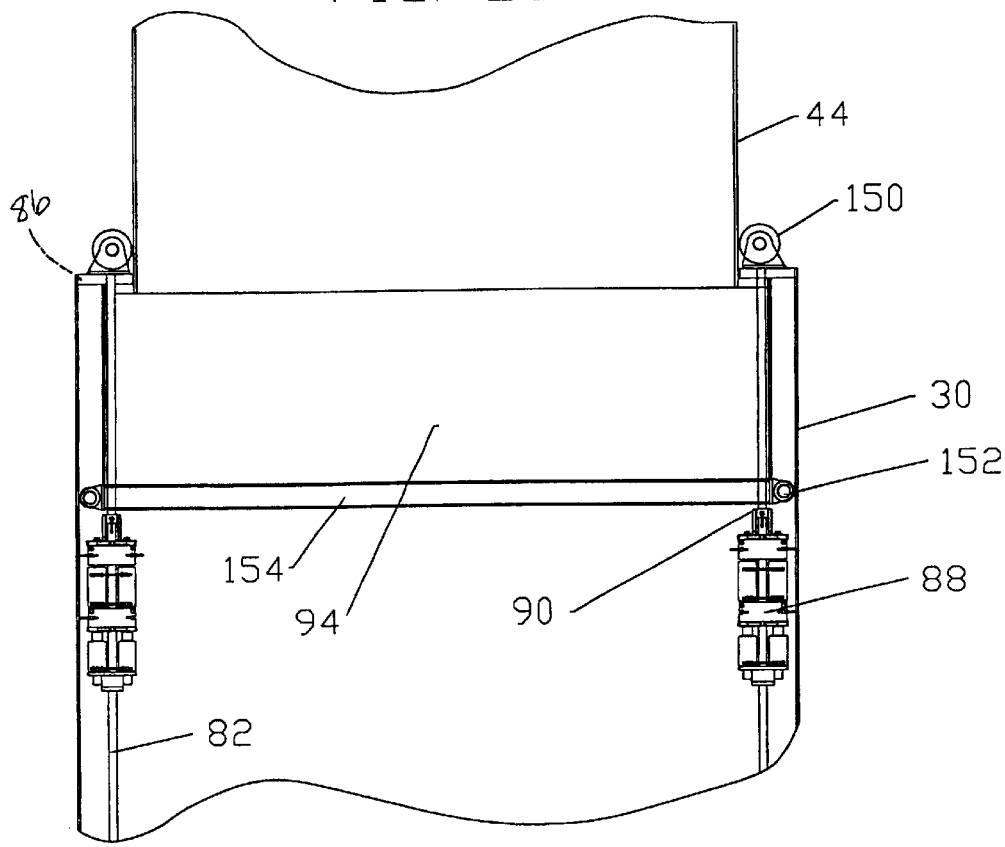
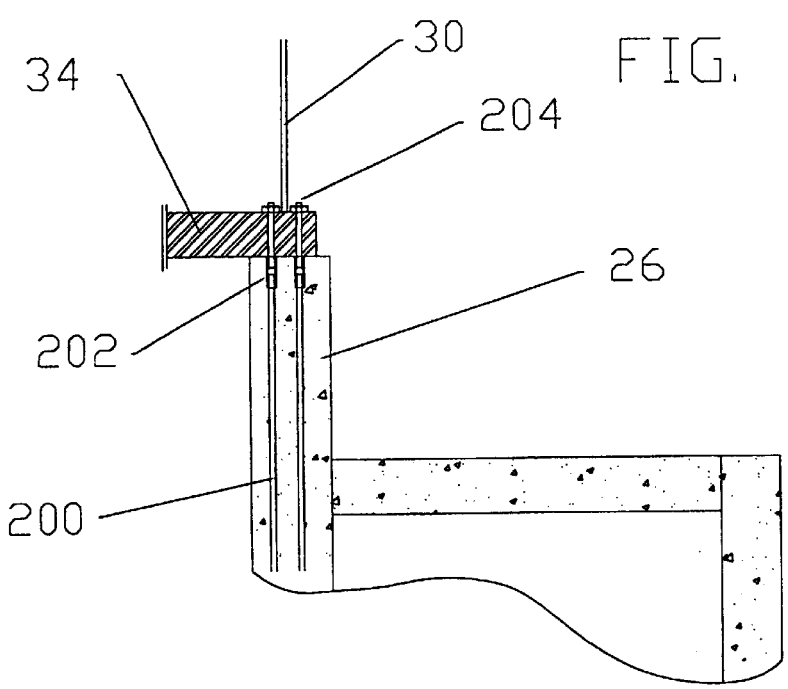

TILT-UP AND TELESCOPIC SUPPORT TOWER FOR LARGE STRUCTURES

BACKGROUND OF THE INVENTION

1. Field of the Invention

The present invention generally relates to tall support towers for large structures, such as wind turbine generators, microwave antennas or the like, and, more specifically, to tall support towers which are constructed of multiple telescopic sections that telescopically extend vertically to the tower's full height and/or to tall support towers which are assembled at the site of installation in a generally horizontal position, and then tilted upwardly to a vertical position. The present invention incorporates both features into unique support tower structures.

2. Description of the Prior Art

Wind-powered windmills and turbines have been in use for many years for producing power for many purposes. Wind power to drive wind turbine generators to generate electrical energy have been used as an alternative energy source for many years, and the development of such uses of wind power is ongoing as exemplified by the following U.S. patents.

| | | |
|---|---|---|
| 11,181 | 3,495,370 | 4,323,331 |
| 446,744 | 3,715,852 | 4,590,718 |
| 2,213,870 | 4,231,200 | 4,903,442 |
| 2,267,705 | | |

Initial development of wind turbine generators to produce electrical energy involved relatively small turbines and generators having a capacity of approximately 50 to 65 kilowatts, which were supported by small towers of approximately 50 to 75 feet in height. Towers of this height were typically fabricated from steel truss members of rectangular plan configuration and of lightweight construction. The lightweight construction enabled the towers to be initially positioned generally horizontally with the lower end pivotally connected to a foundation and the wind turbine and generator mounted at the upper end. The tower was then tilted upwardly to a vertical position by a cable and winch assembly or other power source to pull the tower to a vertical position on the foundation from the generally horizontal position. This tilting of the tower provided a relatively inexpensive installation that could be quickly and efficiently completed in a short time and required the use of only small and highly mobile erection equipment. A problem existed, however, in that as the tower was tilted into vertical position, the feet of the tower conflicted with anchor bolts that protruded from the foundation which would prevent the tower from setting flat on the foundation. This was resolved by bolting multiple steel adapter structures to the anchor bolts with the flat upper surface of each adapter receiving one of the feet of the tower. The tower feet were then bolted to the top of the adapters through matching bolt holes in the feet and top surface of the adapter.

More recent wind power generation included the development of larger and more efficient and cost-effective turbines capable of driving larger generators, having capacities up to approximately 750 kilowatts. The larger turbines and higher capacity generators required that taller support towers be provided in order to maximize the use of winds existing at higher elevations which have higher average speeds and smoother air flow characteristics than winds closer to the ground. In order to erect the larger towers to support the wind turbine generators at the higher elevations needed to maximize power production, heavy lift cranes with a lift capacity of up to 230 tons are used. The taller towers, either steel truss or tubular cross-sectional configuration are erected in sections by the crane and assembled in the vertical position. Each section of the tower is rigidly affixed to the adjacent tower sections by means of bolted connections. In the case of tubular cross-section towers the bolted connections are created through use of matching inwardly oriented flanges at each joint which contained matching boltholes to receive the bolts. The wind turbine generators are then mounted on top of the vertically oriented tower. This procedure is effective for towers up to approximately 180 feet in height with turbine and generator assemblies weighing up to approximately 60,000 pounds.

However, as the tower height increased along with the generating capacity and the weight of the wind turbine generator, the costs of installation increased materially. The transportation costs to move a heavy lift crane to a site of installation and then remove it from the site of installation, as well as the rental cost for a heavy lift crane, can be extremely high. A typical heavy lift crane with a lifting capacity of approximately 230 tons is barely capable of installing a 750 kilowatt wind turbine generator on a tower that is about 200 feet tall. Extra-heavy lift cranes with even higher costs are required for taller towers or heavier generators. Use of the extra-heavy lift cranes increases costs dramatically due to the very high rental and transportation costs of these larger units. Additional costs include the requirement for multiple large trucks and trailers for moving the extra-heavy lift crane to and from the job site, increased risk of serious accidents while traveling during movement of the crane to and from the job site, as well as at the job site, and increased wear and tear on public highways and plant site roads.

The massive size of extra-heavy lift cranes and their limited mobility require that work sites be well prepared to assure stability during the erection process. An extra-heavy lift crane work site requires extensive preparation of road bases with minimal tolerance for allowable slope of the road or for side to side pitch and crane working pads which require the use of heavy temporary matting beneath the cranes. Also, once on a job site, the cranes need to be moved frequently from one wind turbine foundation to another which further adds to high maintenance costs on the cranes and roads and expensive time-consuming moving procedures. This is especially problematic at preferred and available job sites which are usually near the top of hills, ridges or mountains which require erection equipment to be highly mobile in order to minimize erection time and cost. Use of the extra-heavy lift cranes means that many of the best sites cannot be used due to the excessive cost of road and pad construction needed for the larger cranes.

Heavy lift cranes are typically near their maximum safe working ranges when erecting wind turbine generators of 600–750 kilowatt capacity on towers as high as 200 feet. This condition makes it necessary to suspend erection work during winds in excess of 20 to 25 miles-per-hour in order to avoid excessive wind loads on the long crane booms and on the structure being lifted that exceed the safe working loads of the crane. In job sites where such towers are erected, it is not unusual for erection work to be delayed for several days during a windy season and work is frequently delayed due to inclement weather such as rain, ice accumulation or snow. Other constraints associated with heavy and extra-heavy lift crane use include requirements for good visibility so that the operator can see hand signals given by a loadmaster, limited availability of extra-heavy lift cranes during periods of high construction activity, limited availability of extra-heavy lift cranes capable of erecting wind turbine generators having a capacity greater than 750 kilowatts and the time and large number of equipment components necessary to move larger capacity lift cranes to and from the site of tower erection.

The cost and availability of extra-heavy lift cranes has become a serious limiting factor to further economic development of wind energy especially in view of the ongoing development of wind turbine generators having a capacity of up to approximately 2,500 kilowatts. Such generators will require towers as tall as 350 feet in height with turbine generator combinations weighing in excess of 150,000 pounds. Accordingly, the use of increasingly heavier wind turbine generators mounted on ever taller towers has reached a point where the cost of construction has become a significant constraint to further development. Likewise, the limited availability of extra-heavy lift cranes capable of erecting such taller towers and installing heavier wind turbine generators at the upper end thereof have introduced additional serious constraints on the development of wind-powered electrical energy generation.

While the above-identified patents and prior developments in the construction of supporting towers for wind-powered energy include towers which are pivotally supported for tilt-up erection, sectional tower constructions and telescopic tower constructions, the prior art does not disclose a tower assembly incorporating these features which can be constructed to a height and weight capacity necessary to support the larger wind turbine generators without the use of extra-heavy lift cranes.

SUMMARY OF THE INVENTION

In order to overcome the constraints described above in connection with tall towers for large and heavy wind turbine generators, the present invention provides a tall tower capable of supporting a heavy wind turbine generator that starts out as multiple independent tubular tower sections which are nested inside each other while in a generally horizontal position. The number of tower sections is dependent on the desired tower height and configuration and may require two, three or four, or even more, tower sections. The nested sections are appropriately interconnected so as to be internally spaced one from another while oriented in a generally horizontal position at the job site prior to erection. The outermost tower section has a lower edge pivotally connected to the tower supporting foundation by means of a removable hinge structure.

A unique cable, pulley, winch and gin pole structure is then used to tilt the generally horizontal nested sections to an upright vertical position. The wind turbine generator may be mounted on the top end of the innermost tower section either before or after the nested tower sections are tilted to their upright vertical position. Once tilted into their vertical position, the nested tower sections are secured onto the foundation by a flange at the lower end of the outer tower section which is secured to the foundation by a plurality of bolt arrangements. The hinge mechanism is then removed for use on subsequent tower installations. The inner tower section or sections and the wind turbine generator are then telescopically raised to the final elevated position by a unique elevating and guiding mechanism that extends the inner tower section or sections to the maximum vertical height of the tower. Once extended to full height, the tower sections are fastened together to form a rigid structure by means of matching but oppositely oriented flanges with matching boltholes. By combining a tilting and telescoping tower assembly, the necessity for using extra-heavy lift cranes at the job site can be eliminated. Additionally, the towers can be telescopically lowered for maintenance access purposes, eliminating the need for extra-heavy lift cranes during maintenance.

The unique portable gin pole mechanism of the present invention is preferably a lattice frame structure having its lower end pivotally connected to the tower foundation in spaced opposed relation to the pivotal connection between the outer tower section and the foundation. The gin pole is attached to the foundation by pivotal connections while in a generally horizontal position and then raised from a generally horizontal position and oriented in a position angled outwardly in relation to the final vertical position of the nested tower sections when they are vertically positioned. An inexpensive light-weight crane assists in initially raising the outer end of the gin pole, from its beginning horizontal position and then the weight of the at rest tower and wind turbine generator is used as a counterweight in raising the gin pole to its upright position by operating the winch and tightening the cable that is associated with the winch. The upper end of the gin pole and the upper end of the outer tower section tilt the gin pole structure upwardly about the pivotal connections between the base of the gin pole and the foundation.

The gin pole is then anchored in its upwardly angled position. The nested tower sections are then tilted upwardly to their vertical position by a winch mounted on the foundation with a cable and pulley arrangement associated with the upper end of the gin pole and the upper end of the outer tower section. The nested tower sections are thus tilted upwardly about the pivotal connection between the outer tower section and the foundation.

Recessed anchor bolts consisting of high strength threaded rods topped with threaded couplers are embedded in the concrete foundation flush with the top of the foundation. The couplers receive high strength bolts that rigidly affix the base or anchor plate of the vertically oriented outer tower section to the foundation. Use of the threaded couplers flush with the foundation top surface allows the nested tower sections to be tilted into place without conflicting with embedded anchor bolts that otherwise extend above the surface of the concrete foundation.

After the nested tower sections are positioned in their vertical position and the outer tower section is rigidly bolted to the foundation, the lifting mechanisms in the tower are activated to extend the nested tower sections. In a preferred embodiment, the lifting mechanism between the outermost tower section and the adjacent or second tower section nested inside the outermost section is a jacking mechanism, and the lifting mechanism between the second tower section and additional tower sections, such as a third and perhaps fourth tower section, is a cable and pulley mechanism. The cable and pulley mechanism interconnects each of the innermost upper tower sections preferably in a manner such that all of the innermost upper nested tower sections automatically extend when the jacking mechanism extends the second tower section from its nested relationship within the outer lowermost tower section.

Alternatively, additional jacking mechanisms in lieu of the cable and pulley mechanism may be positioned internally of the second tower section to engage and lift the lower end of the third tower section, and similarly for additional tower sections, if used. The multiple jacking mechanisms can be operated simultaneously or independently through the use of manual controls or a computerized control system, giving full control of the telescoping operation.

The lifting mechanisms further include a guide system to guide the tower sections as they telescope vertically with respect to each other. A preferred guide system includes inner and outer rollers interacting between adjacent tower sections. The guide system associated with the cable and pulley mechanism acts in a manner to bias the rollers into engagement with internal and external surfaces of the tower sections as they are being extended. This biasing engagement of the rollers prevents relative lateral movement between tower sections so that adjacent tower sections do not come into contact with each other, which would cause damage to hardware installed on the inner surfaces of each tower section.

The jacking mechanism is positioned internally of the outermost lower tower section and includes crawler jacks positioned on vertical, parallel jackrods extending between the upper and lower ends of the outermost lower tower section. The crawler jacks are positioned below the second tower section and engage the lower end of the second tower section to lift it upward, or lower it downward. The inner guide rollers associated with the jacking mechanism are affixed to the lower structure of the second tower section and engage the internal surfaces of the lowermost tower section as the second section is being extended. The outer guide rollers are affixed to the upper flange of the lowermost tower section and engage the external surface of the second tower section. These guide rollers also prevent lateral movement of the second tower section so that the first and second tower sections do not come into contact with each other, which would cause damage to hardware installed on the inner surface of the first tower section.

Also in accordance with the present invention, the floor of the foundation is preferably recessed below the base of the support tower for mounting electronic controls and switchgear required for operation of the wind turbine generator. Recessing the floor in this manner allows the controls and switchgear to be mounted on the foundation prior to assembly and erection of the tower sections and provides sufficient clearance between the bottom tower section and the switchgear when the tower is tilted into the vertical position such that the switchgear does not conflict with erecting the tower.

It is therefore an object of the present invention to provide a tilt-up telescopically sectional tower for supporting a large load at the tower top such as a wind turbine generator, microwave communication equipment, high voltage electrical transmission lines and the like.

Another object of the present invention is to provide a support tower for a wind turbine generator in which the tower includes a plurality of telescopically associated tower sections that are horizontally supported with an outer lowermost tower section hingedly connected to a supporting foundation. The nested tower sections are tilted upwardly to a vertical position and securely anchored to the foundation. The tower sections are then telescopically extended vertically to elevate the wind turbine generator to a fully extended position.

Still another object of the present invention is to provide a support tower including a plurality of nested telescoped tower sections of decreasing cross-sectional area from a lower tower section to an upper tower section. The tower sections are horizontally positioned and then tilted to a vertical position and securely anchored to the foundation. The tower load, such as a wind turbine generator or the like, is mounted on the upper end of the uppermost tower section either before or after the nested tower sections are tilted into the vertical position, after which the tower sections are extended to their full vertical height to position the tower load in an elevated position.

A further object of the present invention is to provide a support tower in accordance with the preceding objects in which the erection process can be safely and quickly performed by a small crew of personnel while maintaining complete stability of the tower sections during erection with the elevating process being reversible in the event it is necessary to lower the load supported at the upper end of the tower for maintenance or replacement purposes.

Still another object of the present invention is to provide a support tower for supporting heavy structures at a high elevation in accordance with the preceding objects in which the cost of erection is minimized by utilizing equipment that can be easily transported to and from the site of erection, requiring the use of a minimum number of personnel during the erection procedure, enabling the erection process to be completed in a safe and efficient manner in adverse weather and lighting conditions and enabling heavy structures to be supported from the tower by tilting the tower from a horizontal position to a vertical position and then extending telescopic tower sections to a full vertical height of the tower.

Yet another object of this invention to be specifically enumerated herein is to provide a tilt-up and telescopic tower for wind turbines and other structures in accordance with the preceding objects and which will conform to conventional forms of manufacture, be of simple construction and easy to use so as to provide a support tower that will be economically feasible, long lasting and relatively trouble free in operation.

These together with other objects and advantages that will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a schematic side sectional view similar to FIGS. 3 and 4 illustrating the final step in the assembly of the second tower section in internal nested relation to the lowermost outer tower section.

FIG. 6 is a schematic side elevational view illustrating the internal nested relation of a third tower section within the second tower section and the lowermost tower section.

FIG. 7 is a schematic cross sectional view of the second tower section and lowermost outer tower section illustrating the relationship of the removable roller assembly used during nesting of adjacent tower sections.

FIG. 8 is a schematic side elevational view illustrating the nested tower sections with a wind turbine generator mounted to the uppermost end of the tower, associated with a gin pole of the present invention and illustrating a lightweight crane lifting the outer end of the gin pole from a horizontal position toward an upwardly angled position.

FIG. 9 is a schematic side elevational view illustrating the at rest weight of the horizontally disposed nested tower sections and wind turbine generator being used to pivot the gin pole towards its final position.

FIG. 15 is a schematic sectional detail view illustrating the upper guide for the cable and pulley mechanism to maintain proper spacing between the second and third tower sections during their telescopic movement.

FIG. 16 is an additional schematic sectional detail view illustrating the lower guide for the cable and pulley mechanism to maintain proper alignment and internal spacing between the second and third tower sections during extension.

FIG. 17 is a schematic sectional detail view of a spring compensator incorporated into the cables of the cable and pulley mechanism for extending the tower sections.

FIG. 20 is a schematic sectional view illustrating a support tower of the present invention having three nested tower sections with a segmented ladder structure and a recessed foundation floor.

FIG. 20A is a schematic sectional plan detail view of the tower structure of FIG. 20 illustrating the ladder sections for the two lower tower sections nested within the fully installed ladder for the upper tower section at the time the upper tower section is delivered to the site.

FIGS. 24–27 are schematic elevational views illustrating the mechanism and procedure for extending the nested ladder sections in the upper tower section of the present invention to their final position in the lower tower section.

FIG. 28 is a schematic sectional view illustrating the top end of the lowermost outer tower section and the bottom end of a raised inner tower section therein with the lower guide roller mechanism mounted on the outer periphery of the base of the inner tower section engaging the internal surface of the outer tower section and the upper guide roller mechanism mounted on the top flange of the outer tower section engaging the external surface of the inner tower section. Also illustrated are the crawler jacks mounted on the jack rods and contacting a lift structure fastened to the lower edge of the maintenance skirt and platform on the bottom of the inner tower section.

FIG. 29 is a schematic detail view illustrating the threaded couplers embedded in the upper surface of the concrete foundation receiving bolts for securing the tower base flange in order to successfully tilt the tower into vertical position.

DESCRIPTION OF THE PREFERRED EMBODIMENT

Figure 1:
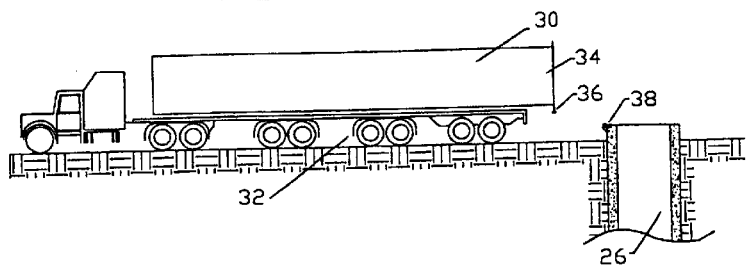
FIG. 1 is a schematic side elevational view illustrating an initial step in delivering a lowermost tower section to an installation site having a preinstalled foundation. A removable hinge plate is affixed to the bottom surface of the tower section bottom flange for subsequent pivotal connection with a removable pin mechanism attached to the foundation.

Although a preferred embodiment and an alternative lift component of the invention are explained in detail, it is to be understood that the embodiment and alternative are given by way of illustration only. It is not intended that the invention be limited in its scope to the details or sequence of construction and arrangement of components set forth in the following description or illustrated in the drawings. Also, in describing the preferred embodiment, specific terminology will be utilized for the sake of clarity. It is to be understood that each specific term includes all technical equivalents that operate in a similar manner to accomplish a similar purpose.

Figure 18:
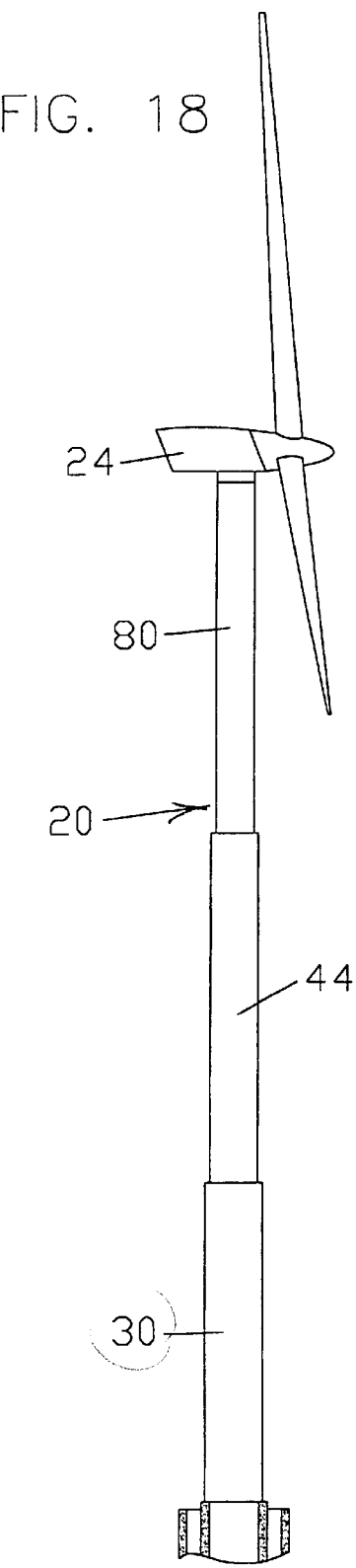
FIG. 18 is a schematic side elevational view of a support tower of the present invention and a supported wind turbine generator in their final position.

FIG. 18 illustrates the assembled support tower, generally designated by reference numeral 20, in its final vertical position. The illustrated tower consists of three telescoping sections 30, 44 and 80. A wind turbine generator 24 is mounted on the upper end of the innermost section 80 atop the tower 20.

FIGS. 1–7 illustrate the steps and structure of the tower sections as they are being positioned in nested horizontal position. The lower end of the lowermost outer tower section 30 is connected to a preinstalled foundation 26 by a unique removable split hinge connection 28, illustrated in FIGS. 3 and 3A. The split hinge connection 28 consists of a hinge plate 36 attached to the bottom surface of the flange 34 of the tower section 30 and a pin mechanism 38 attached to the foundation 26. The split hinge connection 28 permits the tower 20 to be pivoted from a horizontal position to a vertical position after the tower sections 30, 44 and 80 have been telescopically nested while in horizontal position.

In assembling the tower sections, the lowermost tower section 30 is transported to a position adjacent the foundation 26 by a suitable tractor trailer unit 32, as illustrated in FIG. 1. The lower end of the lowermost section 30 of the tower includes a base or anchor flange 34 to which a removable reusable hinge plate 36 is affixed to the bottom surface thereof for connection with a removable reusable pin mechanism 38 affixed adjacent the upper end edge of the foundation 26.

Figure 2:
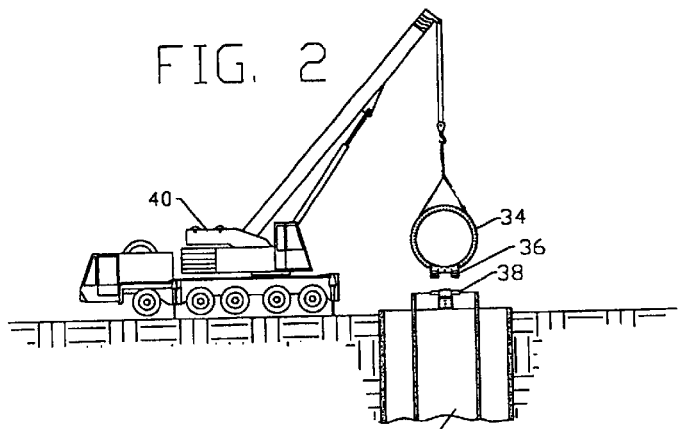
FIG. 2 is a schematic end elevational view illustrating one manner of lifting the lowermost section of the tower for pivotal connection with the foundation.
Figure 3A:
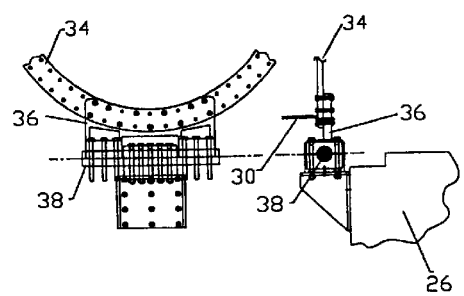
FIG. 3A is a detail of the pivotal connection showing schematic side and end views of the assembled hinge, foundation and bottom flange of the lowermost tower section.
Figure 3:
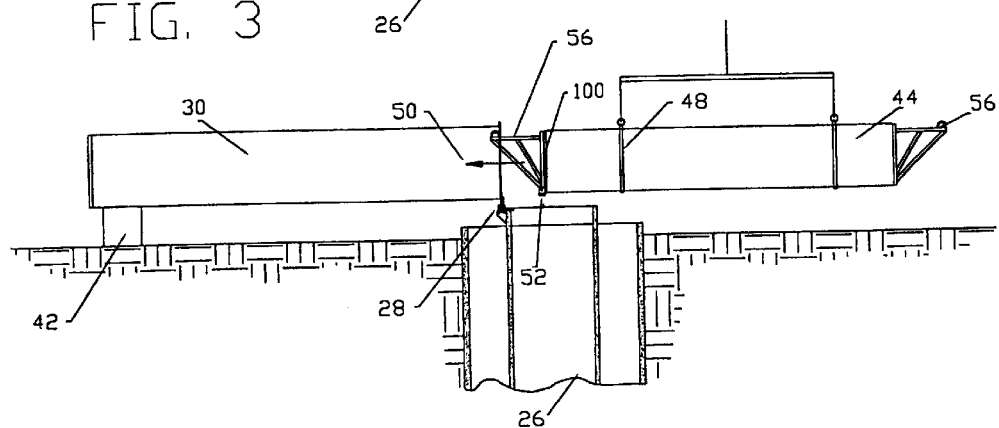
FIG. 3 is a schematic side elevational view illustrating a first step in the assembly of a second tower section in internal nested relation to the lowermost outer tower section which is supported horizontally by blocks at the upper end and by the pivotal connection to the foundation at the lower end.

The lowermost tower section 30 is unloaded from the transport vehicle 32, as by a lightweight crane 40 such as shown in FIG. 2, which lifts and positions the lowermost section 30 to enable pivotal connection of the components 36 and 38 of hinge 28, as illustrated in FIGS. 3 and 3A. The connection of hinge 28 thus pivotally connects the flange 34 on lower tower section 30 to the foundation 26 for pivotal movement about a horizontal axis.

Figure 4:
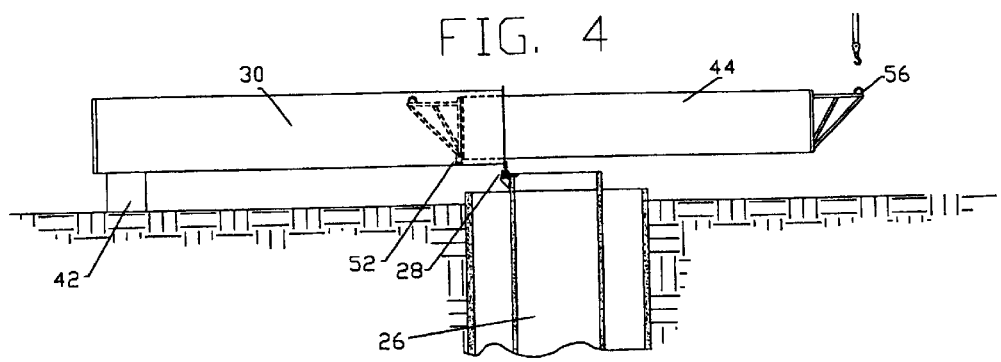
FIG. 4 is a schematic side elevational view similar to FIG. 3 illustrating a second step in the assembly of the second tower section in internal nested relation to the lowermost outer tower section.

After the lowermost tower section 30 is connected to the foundation 26 through the removable hinge connection 28, tower section 30 is supported in a generally horizontal position by a support structure 42 which may be in the form of support blocks or the like, at the end thereof remote from the pivotal connection with the foundation. Then the second tower section 44, after transport to the job site, is lifted as by slings 48 connected to a lightweight crane (not shown in FIG. 3). The second tower section 44 is inserted longitudinally into nesting relationship internally of the lower tower section 30, as indicated by directional arrow 50 in FIG. 3. The tower section 44 is temporarily provided with rollers 52 attached to the outer side of the flange 100 at the upper end of tower section 44, as illustrated in FIGS. 3, 4 and 7. The rollers 52 maintain a spaced relation between the tower sections as they are being assembled and permit the upper end of tower section 44 to roll along the inner surface of tower section 30 as tower section 44 is inserted into tower section 30. Lifting brackets 56 are temporarily mounted on the lower and upper ends of the tower section 44 to which crane lines may be attached to support the respective ends of the tower section 44 while it is being inserted into the lower tower section 30 so that the tower sections 30 and 44 are positioned in nested relationship, as illustrated in FIG. 5. At this point the roller assembly 52 and the nesting brackets 56 are removed. This process is repeated for additional tower sections with each tower section being of smaller cross-sectional area and assembled in internal nested relationship to previous tower sections.

Figure 14:
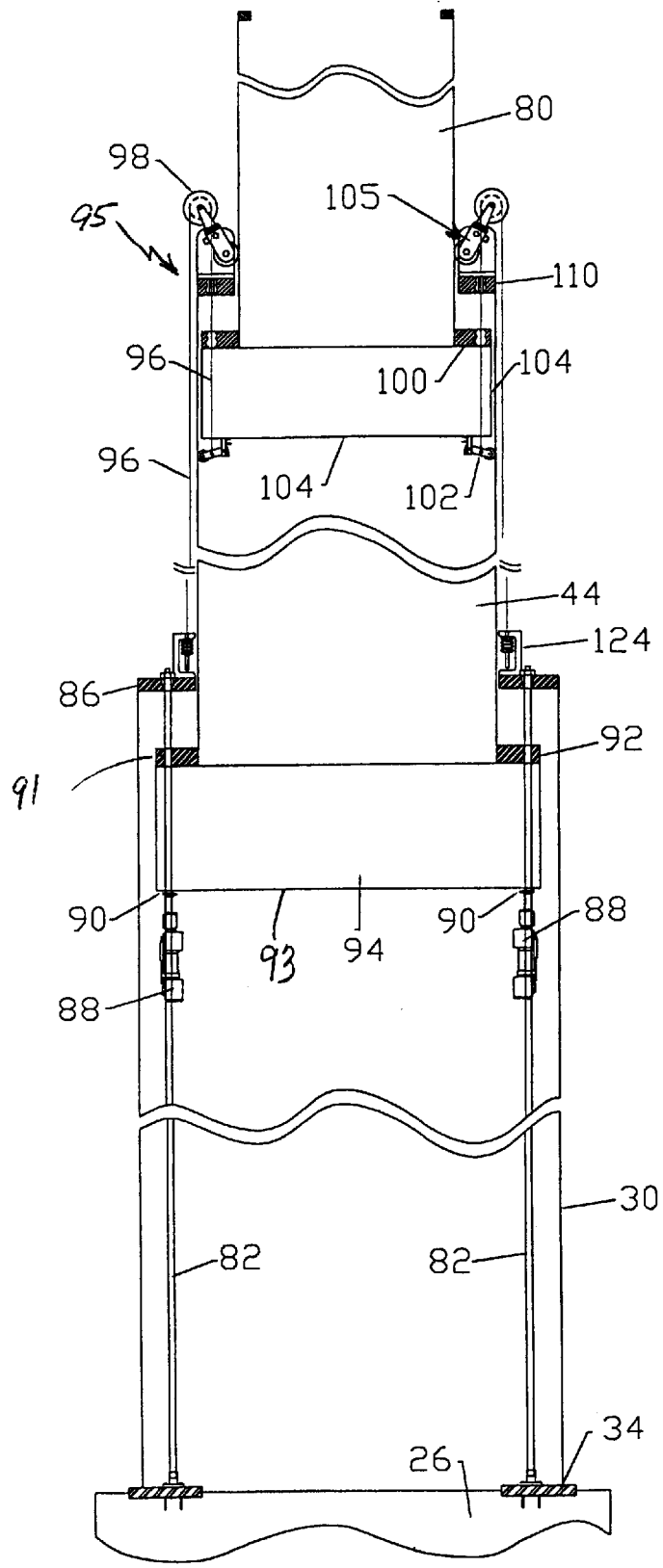
FIG. 14 is a schematic sectional elevational view illustrating the association of first, second and third telescopic tower sections in a partially extended position and showing the lifting mechanisms by which they are extended.

As each tower sections is positioned horizontally in nested relationship within the next larger tower section, knee brackets 33 can be temporarily affixed to the lower end of the inner tower section and affixed to the internal bottom flange of the adjacent lower (outer) tower section. Brackets 33 provide vertical support of the inner tower section or sections after the nested tower sections are tilted to the upright vertical position. Guide roller mechanisms 105 and 102, as illustrated in FIGS. 14–16, and guide roller mechanisms 150 and 152, as illustrated in FIG. 28, are installed during nesting to maintain equal circumferential spacing between tower sections.

The wind turbine generator 24 may be mounted on the upper end of the inner uppermost tower section 80 while the nested tower sections are supported by support structure 42 in a generally horizontal position, as illustrated in FIG. 8, or it may be mounted after the nested tower sections are tilted into vertical position. In either case, the generator 24 is preferably mounted on tower section 80 before the nested tower sections 44 and 80 are elevated to their final extended position as shown in FIG. 18.

FIGS. 8–13 illustrate the nested tower sections 30, 44 and 80, and wind turbine generator 24 being pivoted to an upright vertical position by the use of a gin pole 58 pivotally anchored to the foundation 26, such as at hinge points 60. The gin pole 58 is of standard lattice construction and can be erected at the job site or transported there after assembly elsewhere. Anchor cables 61 have one end 62 affixed to the foundation 26 and the other end 63 affixed to the upper end of gin pole 58. A winch 64 mounted on the foundation includes a lift cable 66 extending over a pulley 68 at the upper end of the gin pole 58. The cable 66 then extends around a pulley 70 at the upper end of the lowermost outer tower section 30 with the cable 66 then going back to an anchor point 72 on the upper end of the gin pole 58. A lightweight lift crane 73 can be used to initially lift the assembled gin pole structure from a horizontal position toward an angled vertical position, with the winch 64 keeping the cable 66 under tension.

Figure 10:
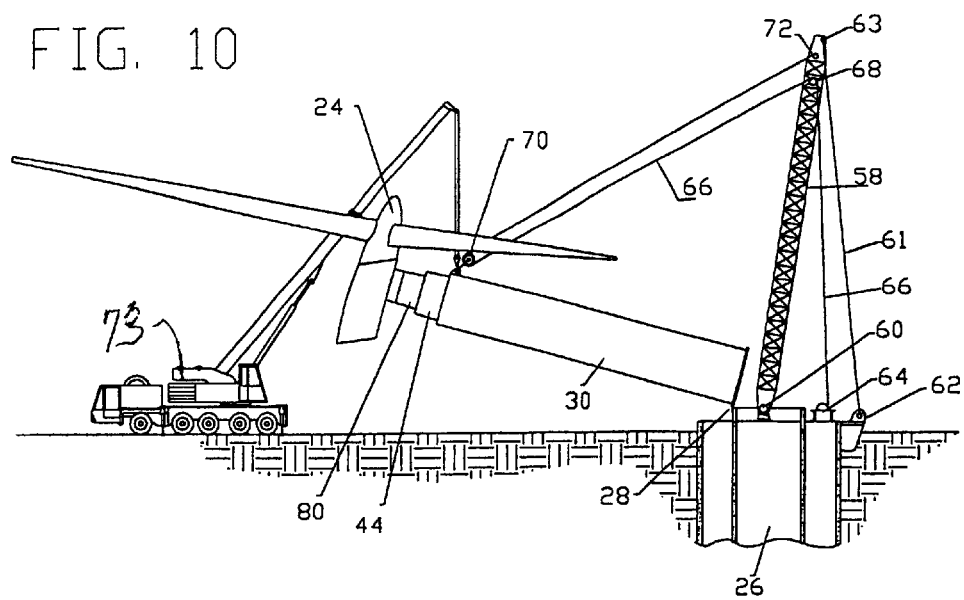
FIG. 10 is a schematic side elevational view illustrating the gin pole in its anchored final operating position and the use of a lightweight crane to initially assist in lifting the nested tower section and affixed wind turbine generator from a horizontal position towards a vertical position.
Figure 11:
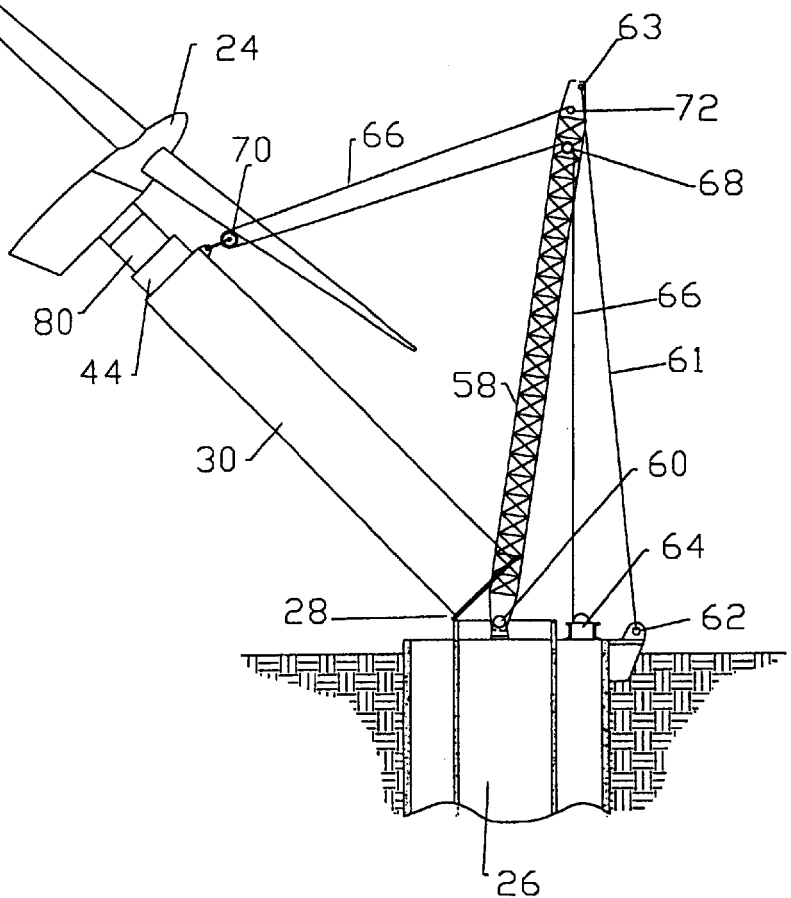
FIG. 11 is a schematic side elevational view similar to FIG. 10 with the gin pole tilting the nested tower sections and wind turbine generator towards a final vertical position.
Figure 13:
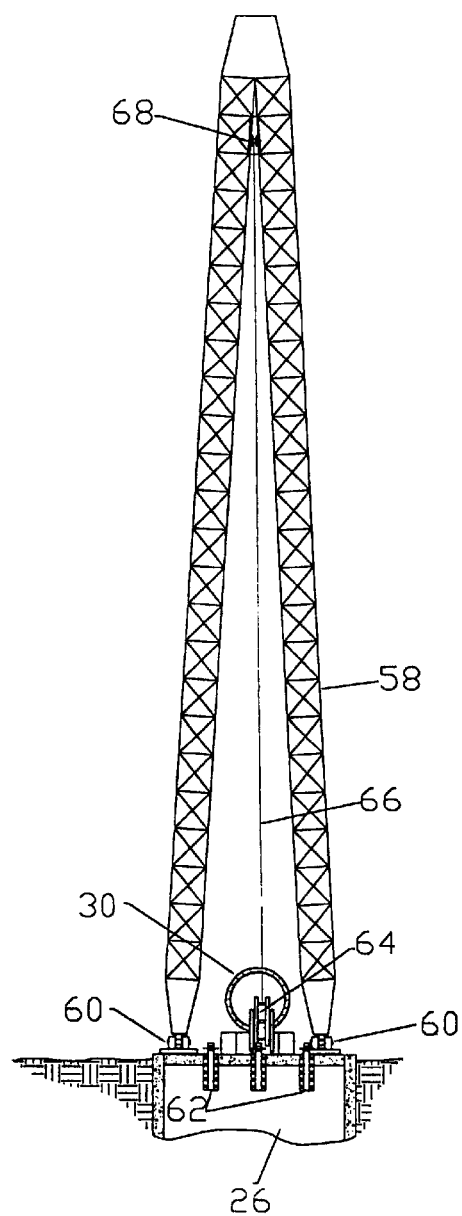
FIG. 13 is a schematic rear elevational view of the gin pole in its final operating position and its association with the nested tower sections when in a horizontal position.
Figure 12:
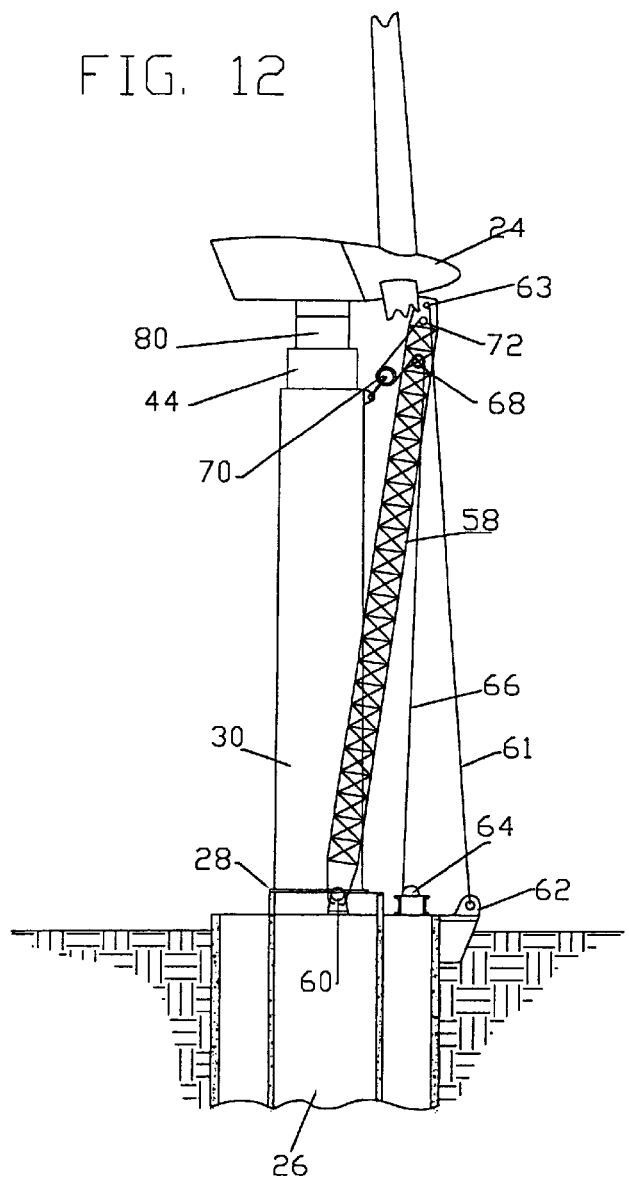
FIG. 12 is a schematic side elevational view similar to FIG. 11 with the nested tower sections and wind turbine generator tilted to a final vertical position.

After initial lifting, as by the lightweight lift crane 73, the continued upward tilting of the gin pole 58 is accomplished by reeling in cable 66 using winch 64 against the dead, or at rest, weight of the nested tower sections 30, 44 and 80, and the generator 24 if mounted thereon, as shown in FIG. 9. Tilting of the gin pole 58 continues to its operational vertical position, angled slightly less than vertical as shown in FIGS. 10, 11 and 12. The anchor cables 61 prevent the gin pole 58 from rising too far and conflicting with the nested tower sections 30, 44 and 80 and wind turbine generator 24 as they are tilted to a vertical position, as shown in FIGS. 11 and 12.

Once the gin pole 58 is at its angled operational vertical position, the gin pole is then in position to assist in tilting up the nested tower sections (and generator if attached). The light weight crane 73 initially lifts the tower 20 from its horizontal position towards the vertical position (see FIG. 10), and the gin pole 58, winch 64 and lift cable 66 complete the pivotal movement to the vertical position (see FIG. 11) by further reeling in of cable 66 with winch 64. The gin pole 58, winch 64 and lift cable 66 then retain the nested tower sections in vertical position (see FIG. 12), while the flange 34 is bolted securely to threaded anchor bolt couplers embedded in the foundation 26, as illustrated in FIG. 29. With the outer tower section 30 rigidly affixed to the foundation in its prescribed vertical position, with tower sections 44 and 80 nested therein, the split hinge 28, the gin pole 58, cables 61 and 66 and associated structures may be removed and the tower sections may then be extended vertically to position the wind turbine generator 24 at the desired elevation.

FIGS. 14–17 and 28 illustrate the mechanisms for extending the tower sections, including the lower or first tower section 30, the middle or second tower section 44, and the upper or third tower section 80. The number of tower sections may vary depending upon the length of each tower section and the total height of the tower. However, three or more are preferred in order to utilize the automatic lifting feature of the present invention.

The lower tower section 30 is rigid with the foundation 26 and includes a series of vertical jack rods 82 which are positioned at spaced locations inside the periphery of the tower section. The jack rods 82 are rigidly connected between the bottom or lower end of the tower section 30, such as by flange 34 and a top flange 86 which extends inwardly from the top of tower section 30. The jack rods 82 are preferably all parallel with respect to the vertical axis of tower section 30.

Vertically moveable crawler jacks 88 are mounted on each of the jack rods 82 and include a flange 90 engaged with a load member 154 adjacent the bottom end of the middle tower section 44. In the preferred embodiments of the present invention, the second and third tower sections each have a maintenance platform 93 below the lower end of each section. The flange 90 of the moveable crawler jacks 88 is preferably engaged with temporary load member 154 attached to the skirt 94 of the maintenance platform 93 as illustrated in FIG. 28. The jacks 88 can be mounted on the jack rods prior to tilting the nested tower sections to the vertical position, in lieu of knee brackets 33, to provide vertical support to the tower sections and prevent their sliding longitudinally as the tower moves to the vertical orientation. The crawler jacks are of conventional construction consistent with the loads required by the present invention.

As the crawler jacks 88 move up or down the jack rods 82, the middle tower section 44 will be vertically moved telescopically within the lower tower section 30. The second or middle tower section 44 includes a series of interior or inner guide rollers 152 spaced around its lower end, such as around the bottom of the skirt 94 of platform 93 as illustrated in FIG. 28. The rollers 152 contact the inner surface of tower section 30 in order to maintain equal circumferential spacing between the bottom of the second tower section 44 in relation to the inside of lower tower section 30.

The jack rods 82 are rigidly fastened to the flange 86 at the upper end of the lower tower section 30 and extend through guide holes 91 in a peripheral flange 92 at the lower end of the middle tower section 44, but above the maintenance skirt 94. The flange 92 and guide holes 91 guide movement of the middle tower section 44 in relation to lower tower section 30 and also assist in maintaining equal circumferential spacing between tower sections 44 and 30. Also mounted atop flange 86 of the lower tower section 30 are a series of external or outer rollers 150 spaced around flange 86 as illustrated in FIG. 28. The external rollers 150 engage the outside surface of the middle or second tower section 44 and further serve to properly position the middle tower section in relation to the lower section as the middle tower section is raised or lowered with respect thereto.

A cable and pulley mechanism illustrated in FIGS. 14–17 and generally designated by reference numeral 95 automatically extends and retracts the third or top tower section 80 as the crawler jacks 88 extend or retract the middle tower section 44. This movement is obtained by multiple cables 96 which have a fixed length and are spaced circumferentially around the tower sections 44 and 80. One end of cables 96 is connected to the flange 86 at the upper end of the tower section 30. Each of the cables 96 extends vertically upward over a corresponding pulley 98 mounted on inwardly extending horizontal flange 110 at the upper end of the tower section 44. The flange 110 is oriented in spaced parallel but opposite relation to the flange 100 rigid with the exterior of tower section 80. The cables 96 then extend downwardly through holes 109 in flange 110 and holes 111 in flange 100 on the lower end of the top or third tower section 80 (see FIG. 15). The terminal end of each cable 96 is connected to an internal sway control, generally designated by reference numeral 102 at the lower end of skirt 104 rigidly affixed to the lower flange 100 of the tower section 80. Cables 96 lift and guide the tower section 80 telescopically in relation to the tower section 44. The pulleys 98 mounted at the upper end of tower section 44 and which receive cables 96 are each a part of multiple external sway controls, generally designated by reference numeral 105, which are spaced circumferentially around the tower section 80, as illustrated in FIG. 15. The internal sway controls 102 and external sway controls 105 are aligned vertically in associated pairs which are preferably spaced equally around the circumference of middle tower section 44.

The external sway controls 105 each include a bracket mechanism 106 pivotally supported by projecting lugs 108 affixed to the flange 110 rigid with the interior of tower section 44. Each cable 96 extends over the pulley 98 and down through openings 109 and 111 in the flanges 110 and 100 for terminal connection to the internal sway controls 102. The bracket 106 is pivotally attached to the lugs 108 at pivot point 112 and includes a roller 113 which engages the exterior of the upper tower section 80 to guide the upper tower section 80 in relation to the middle tower section 44.

Each internal sway control 102, such as illustrated in FIG. 16, includes a pivotal bracket 114 pivotally supported on lugs 116 at pivot point 113. The lugs 116 are rigidly connected with the lower end of the skirt 104 on the tower section 80. Each cable 96 is anchored to pivotal bracket 114 as at 115, and the free end of each bracket 114 is provided with a roller 117 which engages the interior of the tower section 44. The sway controls 102 and thus 105 maintain equal circumferential spacing between tower sections 44 and 80 and guide the telescopic movement of the tower section 80 in relation to the tower section 44.

As stated earlier, the length of the cable 96 is fixed with one end attached to the top of flange 86. This attachment includes a spring compensation assembly, generally designed by reference numeral 119, illustrated in FIG. 17, in the form of a plurality of stacked Belleville washers 120 mounted between an end ferrule 122 on the cable 96 and a bracket 124 that is rigidly affixed to the flange 86 which, in turn, is rigid with the upper end of the lower tower section 30. Each of the pivotal brackets 106 and 114 are provided with stop blocks 107 and 118, respectively, to limit the movement of the pivotal brackets and the rollers mounted thereon.

Figure 19:
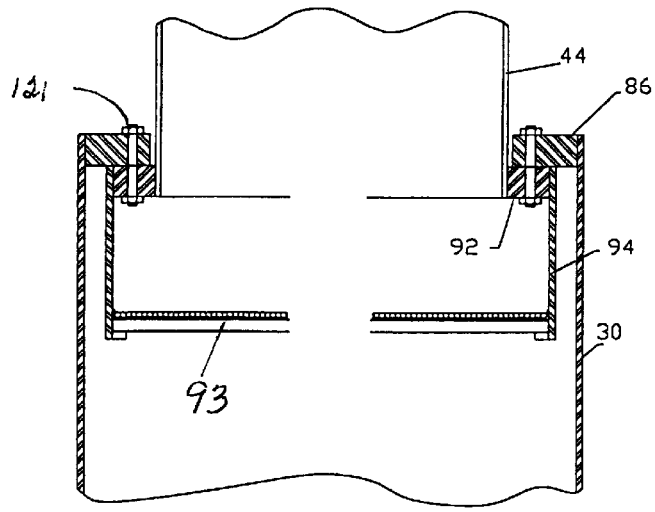
FIG. 19 is a schematic sectional view of a bolted flange joint between the first and second tower sections in their extended position and illustrating the matching but oppositely oriented flanges of the two tower sections that make the telescoping operation feasible, and the bottom skirt and maintenance platform that are attached to the bottom of each upper tower section.

A plurality of jack rods, crawler jacks, cables, cable compensators, internal sway controls and external sway controls are provided in circumferentially spaced relation to the tower sections in order to stabilize the upper tower sections as they are extended. In the preferred embodiments, such components are equally spaced around the tower circumference. Also, preferably, the flanges 92 and 86 are bolted together such as by bolts 121, see FIG. 19, and the flanges 100 and 110 are similarly bolted together after the tower sections 44 and 80 have been fully extended to provide a rigid extended tower. Temporary guy wires (not shown) can be associated with the upper tower sections while the tower sections are being telescopically extended to stabilize the extended tower sections during erection.

FIGS. 20, 20A and 24–27 disclose a ladder structure 130 mounted internally of the tower 20 with the ladder including three segments, each corresponding to the length of the respective tower section in which it will be mounted. The uppermost ladder section 142 in the uppermost tower section 80 is assembled and rigidly installed in the shop on the interior of the wall of the tower section 80 by vertically spaced brackets 143 rigidly attached to the inner surface of the tower section 80 and supporting the uppermost ladder section 142 spaced inwardly from the interior surface of the tower section 80. The ladder section 146 for tower section 30 and ladder section 144 for tower section 44 include temporary mounting of ladder supporting brackets 145 that are folded downward and against the ladder sections and held in folded position by tape or tie straps to permit the two sections 144 and 146 to be nested within the installed ladder section 142 in tower section 80. After the tower sections are nested at the job site and before the tower is tilted vertically, the bottoms of each nested ladder section 144 and 146 are affixed to horizontal pivot members 134 at the bottom of each tower section 30 and 44 respectively. As the tower sections 44 and 80 are extended vertically, the nested ladder sections 144 and 146 are automatically withdrawn from their nested position and extend in longitudinal relation to each tower section 30 and 44.

Tower sections 30 and 44 are provided with maintenance platforms 93 at the bottom of skirts 94 and 104 respectively, each platform having a slotted guide (not shown) that guides the ladder sections 144 and 146 as they are withdrawn from their nested position in relation to ladder section 142 during the tower raising operation and aligns the ladder segments for final assembly after the tower is fully raised.

After the tower sections are completely extended, the ladder segments 144 and 146 are temporarily supported by a cable winch (not shown) from the top of the tower section 80 and the pivotal member 134 associated with each ladder section 144 and 146 is moved to a final position. The ladder section 146 in tower section 30 is illustrated in FIGS. 24–27 and is supported on a pivot member 134 supported in a slotted pivotal bracket 136 with the ladder segment 146 being lifted slightly while plate 139 is removed. The ladder section 146 is lowered and member 134 moves downwardly in slotted bracket 136 into final position on a stop block 138. The supporting structure for the inclined slotted bracket 136 and ladder section 146 includes bracket structures 140 for attachment to the floor of the tower section 30 formed by foundation 26.

The internal ladder brackets 145 are then unfolded and attached in any suitable manner to the inner wall of tower sections 44 and 30. The internal ladder sections provide access to the maintenance platforms 93 to facilitate an operator's gaining access to the components of the tower sections to rigidly bolt the tower sections together and to enable service access to wind turbine generator 24 affixed to the upper end of the uppermost tower section 80.

The lower tower section 30 is provided with an access opening and closure door or panel (not shown) in the peripheral wall to provide access to the interior of the tower 20. Also, each of the maintenance platforms have an opening with a closure door aligned with the ladder sections above and below each platform. This enables access to each tower section and enables the platform to be continuous when the door is closed to enable personnel to move around without danger of falling through the opening. The lower tower section 30 and ladder section 146 may have a platform 93 or floor having an access opening with a door to provide access to the recess or cavity 126 in the upper end of foundation 26 which is adapted to receive switchgear, controls 190 or the like positioned on the bottom 192 of cavity 126 as illustrated in FIG. 20.

Figure 21:
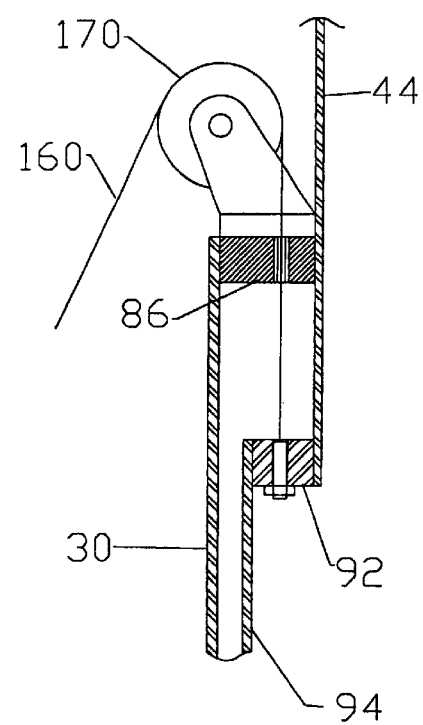
FIGS. 21–23 are schematic elevational views of an alternative embodiment illustrating a winch, pulley and cable mechanism for extending the tower sections in lieu of the jacking mechanism illustrated in FIG. 14.
Figure 22:
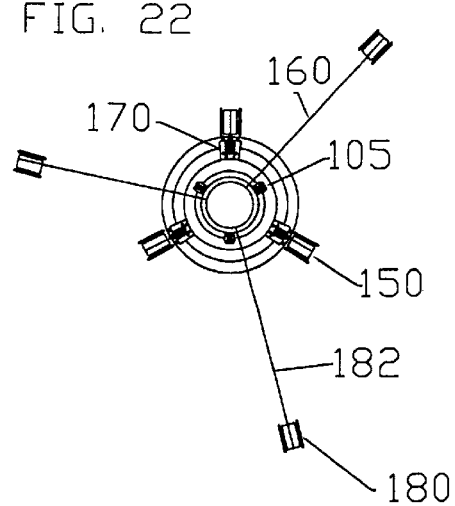
Figure 23:
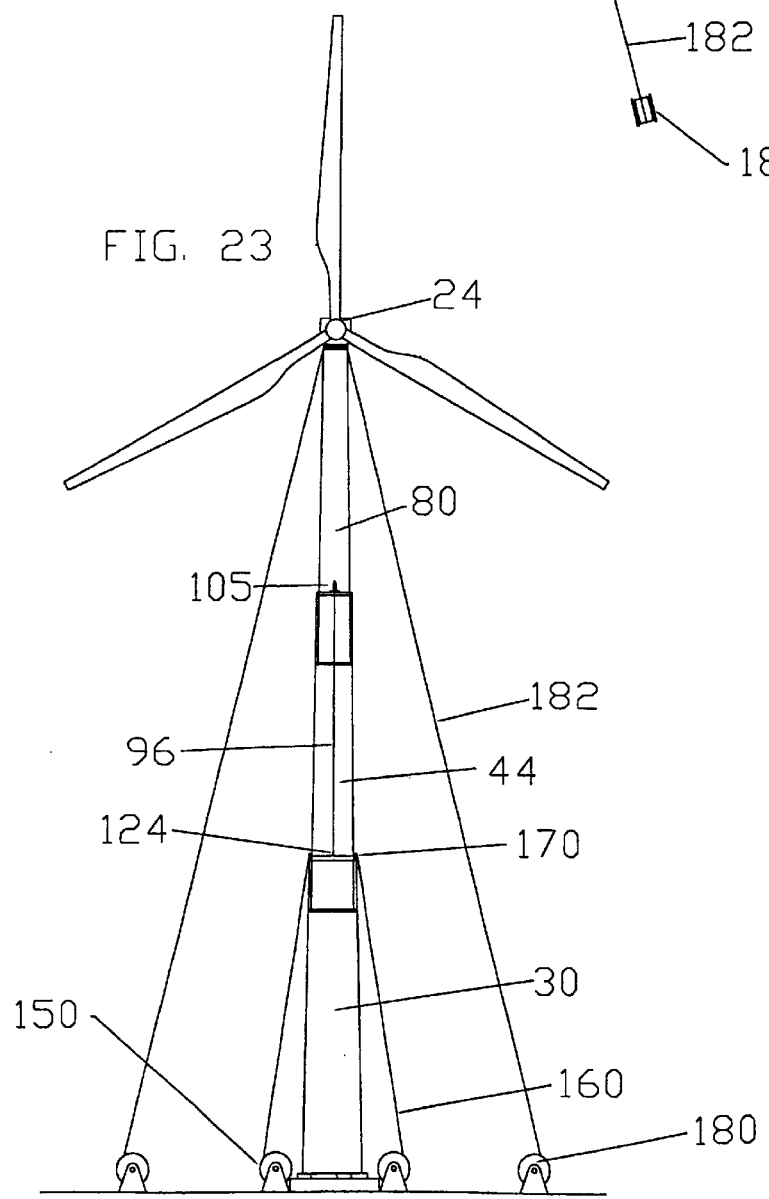

FIGS. 21–23 illustrate an alternate lifting mechanism for telescopically extending the middle tower section 44 with relation to bottom tower section 30. As shown, circumferentially spaced lift mechanisms, each consist of a winch 150, cable 160 and pulley 170. Winches 180 and guy lines 182 are utilized in this embodiment to provide stability to the top of the tower section 80 as it extends telescopically with relation to tower section 44. As illustrated in FIG. 21, movement of cable 160 will lift or lower tower section 44 which will automatically extend the uppermost tower section 80 in the same manner as described and illustrated in FIG. 14 with the crawler jacks being replaced by cables 160 and winches 150.

While the tower sections 30, 44 and 80 are preferably circular in cross-section, it may be possible to use different nesting shapes such as triangular, square or the like. Further, the section walls need not always be solid, but may have openings or even a lattice structure.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be utilized, falling within the scope of the invention.

What is claimed as new is as follows:

1. A tower for supporting a large heavy structure or load from a tower foundation comprising a plurality of elongated, telescopically associated tower sections including a lowermost tower section having an edge portion adapted to be pivotally connected to said tower foundation to enable the tower sections to be pivoted from a generally horizontal nested position to a vertical in use position, a lower lift device interconnecting said lowermost tower section and a first upper tower section, and an upper lift device interconnecting said lowermost tower section and a second upper tower section to simultaneously extend said second upper tower section when said first upper tower section is extended by said lower lift device.

2. The tower as defined in claim 1, wherein said lower lift device is associated with the lower tower section and the first upper tower section and includes a plurality of parallel jack rods rigidly affixed to and within the lower tower section, the first upper tower section including a lower end slidable on said jack rods, each jack rod including a crawler jack having a structure engaging a lower flange on said first upper tower section to move the first upper tower section vertically in relation to the lower tower section.

3. The tower as defined in claim 1, wherein said upper lift device is associated with the first upper tower section and the second upper tower section and includes a plurality of parallel jack rods rigidly affixed to and within the first upper tower section, the second upper tower section including a lower end slidable on said jack rods, each jack rod including a crawler jack having a structure engaging a lower flange on said second upper tower section to move the second upper tower section vertically in relation to the first upper tower section.

4. The tower as defined in claim 2, wherein the crawler jacks are controlled by a unique computerized control system that permits the jacks to be operated in any combination of individual jacks, or all jacks simultaneously.

5. The tower as defined in claim 2, wherein multiple guide rollers are rigidly affixed to a top flange on each lower tower section to engage the external surface of the next upper tower section to guide telescopic movement of the upper tower sections in relation to each other and the lowermost tower section.

6. The tower as defined in claim 1, wherein each of the upper tower sections includes a skirt at a lower end thereof which supports a maintenance platform, multiple guide rollers affixed to the maintenance platform for engaging the internal surface of the adjacent lower tower section to guide telescopic movement of the upper sections in relation to each other and the lowermost tower section and to maintain equal circumferential spacing between adjacent tower sections.

7. The tower as defined in claim 1, wherein said lower lift device consists of a winch, pulley and cable mechanism wherein a number of winches anchored on the ground lift the first upper tower section by means of cables running from the winches around pulleys mounted on a top flange on the lower tower section, then extending downwardly through the top flange and a bottom flange on the first upper tower section, where they are affixed by means of ferrules and a spring compensator device.

8. The tower as defined in claim 7, wherein the winches are operated by a unique computerized control system that permits operation of any combination of individual winches or all winches simultaneously.

9. The tower as defined in claim 6, wherein a plurality of guide rollers are affixed to the bottom of the skirt of the first upper tower section such that they engage the internal surface of the lower tower section to guide telescopic movement of the tower sections in relation to each other and to maintain equal circumferential spacing between adjacent tower sections.

10. The tower as defined in claim 1, wherein said upper lift device between the lower tower section and a second upper tower section includes a plurality of cables having one end attached to the upper end of the lower tower section and extending over a pulley mounted at an upper end of the first upper tower section and extending downwardly between the first upper tower section and the second upper tower section with the lower end of each cable being connected with a lower end of the second upper tower section in a manner that the second upper tower section will be elevated automatically when the first upper tower section is extended vertically toward the upper end of the lower tower section with the pulley on the upper end of the first upper tower section being moved upwardly and lifting the lower end of the second upper tower section toward the upper end of the first upper tower section.

11. The tower as defined in claim 10, wherein the upper end of the first upper tower section includes a plurality of sway control rollers engaging the external surface of the second upper tower section and the lower end of the second upper tower section including sway control rollers mounted on the lower end of the second upper tower section and in engagement with the internal surface of the first upper tower section to guide the movement of the upper tower sections and to maintain equal circumferential spacing between adjacent tower sections during extension of the tower sections.

12. The tower as defined in claim 11, wherein each of said sway control rollers is mounted on a pivotal bracket, said pivotal brackets at an upper end of the first upper tower section supporting the cable pulley at an outer end thereof to bias the sway control rollers against the external surface of the second upper tower section when the cable is tensioned by movement of the first upper tower section upwardly in relation to the lowermost tower section.

13. The tower as defined in claim 11, wherein said sway control rollers at the lower end of the second upper tower section include a pivotal supporting bracket attached to the lower end of the second upper tower section with the lift cables being attached to the pivotal brackets to bias the rollers outwardly into engagement with the internal surface of the first upper tower section when the cable is tensioned by movement of the first upper tower section upwardly in relation to the lowermost tower section.

14. The tower as defined in claim 13, wherein said lift cables are connected to an upper end of the lowermost tower section through a resilient connection to compensate for variation in dimensional relations between the tower sections and lift cables when the upper tower sections are being extended.

15. The tower as defined in claim 1, wherein each of the lower tower sections includes a flange at the top of the tower section oppositely oriented in relation to a matching flange on the bottom of the next upper tower section such that the two flanges will come together when the tower is fully extended telescopically and will allow the tower sections to be rigidly bolted together.

16. The tower as defined in claim 1, wherein each of the tower sections includes a collapsible personnel ladder section such that the ladder sections in the lower tower sections can be folded within the ladder section in the uppermost tower section while the tower sections are in the nested position and wherein the ladder sections will automatically extend into the proper position as the nested tower sections are extended telescopically.

17. The tower as defined in claim 1, wherein said edge portion of said lowermost tower section includes a removable hinge plate fastened to a bottom flange on the lower tower section for connection to a pin mechanism pre-installed on the foundation.

18. The tower as defined in claim 1, wherein the foundation is provided with embedded anchor bolt couplers that are recessed to permit the nested tower section to be tilted to the vertical position and rigidly affixed to the foundation without conflicting with anchor bolts protruding above the surface of the foundation.

19. The tower as defined in claim 1 wherein the foundation is provided with a recessed floor to permit the nested tower section to be tilted to the vertical position without conflicting with equipment mounted on the floor of the foundation.

20. The tower as defined in claim 1 together with a gin pole, winch, pulley and cable lifting mechanism for pivoting the nested tower sections from a horizontal position to a vertical position.

21. A tall tower for supporting heavy loads above a tower foundation which comprises a plurality of elongated tubular tower sections including at least an outer tower section and inner tower section each defined by a substantially continuous cylindrical peripheral wall and initially disposed in a generally horizontal position with said inner section nested within said outer section, said outer tower section having a hinge component adjacent its lower edge for pivotal attachment to said tower foundation to enable the nested tower sections to be pivoted from a generally horizontal position to a generally vertical position, said inner tower section supporting said heavy load when nested in said outer section, and a lift mechanism interconnecting said outer and inner tower sections to telescopically raise said inner tower section and said heavy load to an expanded tower height and fastening devices interconnecting said tower sections when in said expanded tower height.

22. The tower as defined in claim 21, wherein at least one of said tower sections includes guide rollers to guide movement of the inner tower section when raised to an expanded tower height.

23. The tower as defined in claim 21, wherein said lift mechanism includes a plurality of circumferentially spaced jack rods rigidly mounted on said outer tower section, a crawler jack on each jack rod for vertical movement thereon, said crawler jacks being connected to said inner tower section to raise said inner tower section to an expanded tower height.

24. The tower as defined in claim 21, wherein said lift mechanism includes a plurality of circumferentially spaced cable, pulley and winch assemblies associated with said tower sections to raise said inner tower section to an expanded tower height.

25. The tower as defined in claim 21, wherein said inner tower section includes a peripheral flange extending outwardly at a lower end thereof, said outer tower section including a peripheral flange extending inwardly at an upper end thereof and above said flange on the inner tower section, said fastening devices interconnecting said flanges to secure said flanges in adjacent relation to retain said tower sections in said expanded tower height.

26. The tower as defined in claim 21, wherein said outer tower section includes a support flange at a lower end thereof, said tower foundation being provided with embedded anchor bolt couplers located not higher than a top surface of the foundation to permit the nested inner and outer tower sections to be tilted to vertical position without conflicting with anchor bolts projecting above the foundation, said couplers receive anchor bolts inserted through the flange on the outer tower section when the nested tower sections are in vertical position on the foundation.

27. A system for erecting a tall support tower for heavy loads on a tower foundation which comprises a plurality of elongated tower sections with an outer tower section having a lower end pivotally connected to said foundation and an inner tower section nested within said outer tower section while in horizontal position, a gin pole having a pivotally supported lower end, a cable and winch assembly associated with said gin pole and the horizontally positioned nested tower sections, said gin pole, cable and winch assembly lifting and tilting the nested tower sections from a horizontal position to a vertical position with said inner tower section supporting said heavy load, and a lift mechanism interconnecting said tower sections to telescopically raise said inner tower section and said heavy load to an expanded tower height.

28. The system for erecting a tall tower as defined in claim 27, wherein said lift mechanism includes a plurality of circumferentially spaced jack rods rigidly mounted on said outer tower section, a crawler jack on each jack rod for vertical movement thereon, said crawler jacks being connected to said inner tower section to raise said inner tower section to an expanded tower height.

29. The system for erecting a tall tower as defined in claim 27, wherein said lift mechanism includes a plurality of circumferentially spaced cable, pulley and winch assemblies associated with said tower sections to raise said inner tower section to an expanded tower height.

30. The method of erecting a tall support tower having a plurality of elongated telescopic tower sections above a tower foundation comprising the steps of positioning an outer tower section in horizontal position, pivotally connecting one end of the outer tower section to said foundation, assembling an inner tower section in nested relation to said outer tower section, tilting said nested tower sections from a horizontal position to a vertical position and raising the inner tower section to an expanded tower height, said step of tilting the nested tower sections to vertical position including the step of installing a gin pole in upwardly and outwardly angled relation to the final vertical position of the nested tower sections and lifting the nested tower sections by utilizing a winch, cable and pulley system associated with the gin pole and nested tower sections to pivot the nested tower sections about the pivotal connection to the foundation.

31. The method as defined in claim 30, wherein said step of positioning the outer tower section in horizontal position includes the steps of transporting the outer tower section on a transport vehicle, lifting and positioning the outer tower section in horizontal position with a lower end being positioned adjacent the foundation, pivotally connecting a lower end of the outer tower section to the foundation.

32. The method as defined in claim 30, wherein said step of raising the inner tower section includes the step of connecting a lift mechanism to a lower end of said inner tower section and lifting the inner tower section to an expanded tower height.

33. The tower as defined in claim 21, wherein said heavy load supported by said inner tower section is a wind turbine generator.

34. A tower for supporting a heavy load from a tower foundation comprising at least two elongated, telescopically associated tower sections including a lower tower section supported vertically on said tower foundation and an upper tower section telescopically nested in relation to said lower tower section, a lift mechanism interconnecting said lower tower section and said upper tower section, said lift mechanism including a plurality of generally parallel vertical jack rod and crawler jack assemblies interconnecting said lower tower section and said upper tower section to move said upper tower section vertically to an elevated position in relation to said lower tower section, each of said jack rod and crawler jack assemblies including a vertical jack rod rigidly fixed interiorly of said lower tower section, and a crawler jack vertically moveable on said jack rod, said jack rods being mounted vertically and generally parallel within said lower tower section, said crawler jacks engaging a lower end of said upper tower section for lifting it to said elevated position.

35. The tower as defined in claim 34, wherein an upper end portion of said lower tower section and a lower end portion of said upper tower section, when in elevated position, are connected by fasteners to retain said upper tower section in said elevated position.

36. A tower for supporting a heavy load from a tower foundation comprising at least two elongated, telescopically associated tower sections including a lower tower section supported vertically on said tower foundation and an upper tower section telescopically nested in relation to said lower tower section, a lift mechanism interconnecting said lower tower section and said upper tower section, said lift mechanism including a plurality of generally parallel vertical jack rod and crawler jack assemblies interconnecting said lower tower section and said upper tower section to move said upper tower section vertically to an elevated position in relation to said lower tower section, an upper end portion of said lower tower section and a lower end portion of said upper tower section each including a peripheral radially extending flange, said flanges being disposed in adjacent relation when said upper tower section is in said elevated position and fasteners interconnecting said flanges to retain said upper tower section in said elevated position in relation to said lower tower section, said flange on said lower end portion of said upper tower section including apertures slidably receiving said jack rods of the jack rod crawler jack assemblies to guide vertical movement of said upper tower section in relation to said lower tower section.

37. The tower as defined in claim 36, wherein said upper tower section telescopes within said lower tower section, said jack rod and crawler jack assemblies being positioned within said lower tower section.

38. A tower for supporting a heavy load from a tower foundation comprising at least two elongated, telescopically associated tower sections including a lower tower section supported vertically on said tower foundation and an upper tower section telescopically nested in relation to said lower tower section, a lift mechanism interconnecting said lower tower section and said upper tower section, said lift mechanism including a plurality of generally parallel vertical jack rod and crawler jack assemblies interconnecting said lower tower section and said upper tower section to move said upper tower section vertically to an elevated position in relation to said lower tower section, a lower end portion of said upper tower section including a plurality of peripheral guide rollers guidingly engaged with a peripheral surface of said lower tower section to guide relative vertical movement of said tower sections.

39. The tower as defined in claim 38, wherein an upper end portion of said lower tower section and a lower end portion of said upper tower section each include a peripheral radially extending flange, said flanges being disposed in adjacent relation when said upper tower section is in said elevated position and fasteners interconnecting said flanges to retain said upper tower section in said elevated position in relation to said lower tower section.

40. The tower as defined in claim 36, wherein each of said jack rod and crawler jack assemblies includes a vertical jack rod rigidly fixed interiorly of said lower tower section, and a crawler jack vertically moveable on said jack rod, said jack rods being mounted vertically and generally parallel within said lower tower section, said crawler jacks engaging a lower end of said upper tower section for lifting it to said elevated position.

41. A tower for supporting a heavy load from a tower foundation comprising at least two elongated, telescopically associated tower sections including a lower tower section supported vertically on said tower foundation and an upper tower section telescopically nested in relation to said lower tower section, a lift mechanism interconnecting said lower tower section and said upper tower section, said lift mechanism including a plurality of generally parallel vertical jack rod and crawler jack assemblies interconnecting said lower tower section and said upper tower section to move said upper tower section vertically to an elevated position in relation to said lower tower section, and a second upper tower section telescopically nested in relation to said upper tower section nested in said lower tower section, a second lift mechanism interconnecting said upper tower sections to simultaneously move said second upper tower section vertically in relation to said upper tower section nested in said lower tower section when said jack rod and crawler jack assemblies move said upper tower section nested in said lower tower section thereby simultaneously moving both upper tower sections vertically in response to vertical movement of said upper tower section nested in said lower tower section by said jack rod and crawler jack assemblies.

* * * * *

UNITED STATES PATENT AND TRADEMARK OFFICE
CERTIFICATE OF CORRECTION

PATENT NO. : 6,782,667 B2
DATED : August 31, 2004
INVENTOR(S) : Allan P. Henderson et al.

It is certified that error appears in the above-identified patent and that said Letters Patent is hereby corrected as shown below:

<u>Title page,</u>
Item [75], should be listed as follows:
-- [75]  Inventors: Allan P. Henderson, Bakersfield, CA (US)
 Zvi Gershony, Lancaster, CA (US)
 Vaughn Johnson, Tehachapi, CA (US)
 Robert E. Godfrey, Los Angeles, CA (US) --

Signed and Sealed this

First Day of March, 2005

JON W. DUDAS
*Director of the United States Patent and Trademark Office*